United States Patent
Kato et al.

(10) Patent No.: US 8,938,360 B2
(45) Date of Patent: Jan. 20, 2015

(54) GUIDANCE APPARATUS AND GUIDANCE METHOD

(71) Applicant: Fujitsu Limited, Kawasaki (JP)

(72) Inventors: Hideyuki Kato, Hachioji (JP); Katsuaki Akama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/152,625

(22) Filed: Jan. 10, 2014

(65) Prior Publication Data

US 2014/0297184 A1 Oct. 2, 2014

(30) Foreign Application Priority Data

Mar. 28, 2013 (JP) ................. 2013-070345

(51) Int. Cl.
*G01C 21/00* (2006.01)
*A61H 3/06* (2006.01)
*G01C 21/36* (2006.01)
*G08G 1/09* (2006.01)

(52) U.S. Cl.
CPC ............ *G01C 21/00* (2013.01); *A61H 3/061* (2013.01); *G01C 21/3652* (2013.01); *G08G 1/09* (2013.01)
USPC .......... 701/538; 701/400; 701/408; 701/409; 701/433; 701/434; 701/442; 701/466

(58) Field of Classification Search
CPC .................................................. G01C 21/3652
See application file for complete search history.

(56) References Cited

U.S. PATENT DOCUMENTS

| | | | |
|---|---|---|---|
| 6,320,496 B1 * | 11/2001 | Sokoler et al. | 340/407.1 |
| 6,502,032 B1 * | 12/2002 | Newman | 701/487 |
| 7,456,729 B2 * | 11/2008 | Khoury | 340/407.1 |
| 7,788,032 B2 * | 8/2010 | Moloney | 701/472 |
| 7,957,857 B2 * | 6/2011 | Sakurai et al. | 701/23 |
| 8,451,103 B2 * | 5/2013 | Hwang et al. | 340/407.1 |
| 8,462,125 B2 * | 6/2013 | Birnbaum et al. | 345/173 |
| 8,471,722 B2 * | 6/2013 | Kaneko et al. | 340/815.64 |
| 8,587,417 B2 * | 11/2013 | Birnbaum et al. | 340/407.1 |
| 8,594,935 B2 * | 11/2013 | Cioffi et al. | 701/533 |
| 2005/0140544 A1 * | 6/2005 | Hamel et al. | 342/357.08 |

(Continued)

FOREIGN PATENT DOCUMENTS

| | | |
|---|---|---|
| JP | 2000-352521 | 12/2000 |
| JP | 2003-240850 | 8/2003 |

(Continued)

OTHER PUBLICATIONS

EESR—Extended European Search Report dated Aug. 27, 2014 issued with respect to the corresponding European Patent Application No. 13198557.4.

*Primary Examiner* — Jonathan M Dager
(74) *Attorney, Agent, or Firm* — Fujitsu Patent Center

(57) ABSTRACT

A guidance apparatus for guiding to a predetermined orientation includes a detection section configured to detect a contact of an object via a contact surface; a measurement section configured to measure an orientation of the guidance apparatus; a calculation section configured to calculate a direction of the predetermined orientation relative to the orientation measured by the measurement section; and a vibration section configured to generate vibration if the contact of the object is detected by the detection section either within an area including the direction, or within another area other than the area including the direction, among a plurality of areas partitioning the contact surface.

3 Claims, 5 Drawing Sheets

(56) References Cited

U.S. PATENT DOCUMENTS

| | | | |
|---|---|---|---|
| 2006/0261978 A1* | 11/2006 | Yokota et al. | 340/933 |
| 2006/0293839 A1* | 12/2006 | Stankieiwcz et al. | 701/200 |
| 2007/0106457 A1* | 5/2007 | Rosenberg | 701/200 |
| 2009/0247230 A1* | 10/2009 | Lundy et al. | 455/566 |
| 2010/0073201 A1* | 3/2010 | Holcomb et al. | 340/990 |
| 2010/0207895 A1* | 8/2010 | Joung et al. | 345/173 |
| 2011/0098910 A1* | 4/2011 | Saarimaki et al. | 701/200 |
| 2012/0102399 A1* | 4/2012 | Nicholson | 715/702 |
| 2012/0124470 A1* | 5/2012 | West et al. | 715/702 |
| 2012/0144299 A1* | 6/2012 | Patel et al. | 715/702 |
| 2012/0242591 A1* | 9/2012 | Kawalkar | 345/173 |
| 2012/0286944 A1* | 11/2012 | Forutanpour et al. | 340/407.1 |
| 2012/0303264 A1* | 11/2012 | Su et al. | 701/416 |
| 2012/0313857 A1* | 12/2012 | Senanayake et al. | 345/168 |
| 2012/0327006 A1* | 12/2012 | Israr et al. | 345/173 |
| 2013/0002452 A1* | 1/2013 | Lauren | 340/944 |
| 2013/0049957 A1* | 2/2013 | Seki et al. | 340/539.13 |
| 2013/0218456 A1* | 8/2013 | Zelek et al. | 701/412 |
| 2013/0220392 A1* | 8/2013 | Gassert et al. | 135/66 |
| 2013/0278533 A1* | 10/2013 | Kim et al. | 345/173 |
| 2013/0278635 A1* | 10/2013 | Maggiore | 345/633 |
| 2013/0339304 A1* | 12/2013 | Lee et al. | 707/652 |
| 2014/0002581 A1* | 1/2014 | Bear et al. | 348/14.07 |
| 2014/0210758 A1* | 7/2014 | Park et al. | 345/173 |

FOREIGN PATENT DOCUMENTS

| | | |
|---|---|---|
| JP | 2008-286546 | 11/2008 |
| JP | 2011-526432 | 10/2011 |
| JP | 2011-220849 | 11/2011 |
| WO | 2009/149770 | 12/2009 |

\* cited by examiner

| AREA NAME | RANGE |
|---|---|
| AREA A1 | 351 TO 22 DEGREES |
| AREA A2 | 23 TO 78 DEGREES |
| AREA A3 | 79 TO 112 DEGREES |
| AREA A4 | 113 TO 168 DEGREES |
| AREA A5 | 169 TO 202 DEGREES |
| AREA A6 | 203 TO 248 DEGREES |
| AREA A7 | 249 TO 304 DEGREES |
| AREA A8 | 305 TO 350 DEGREES |

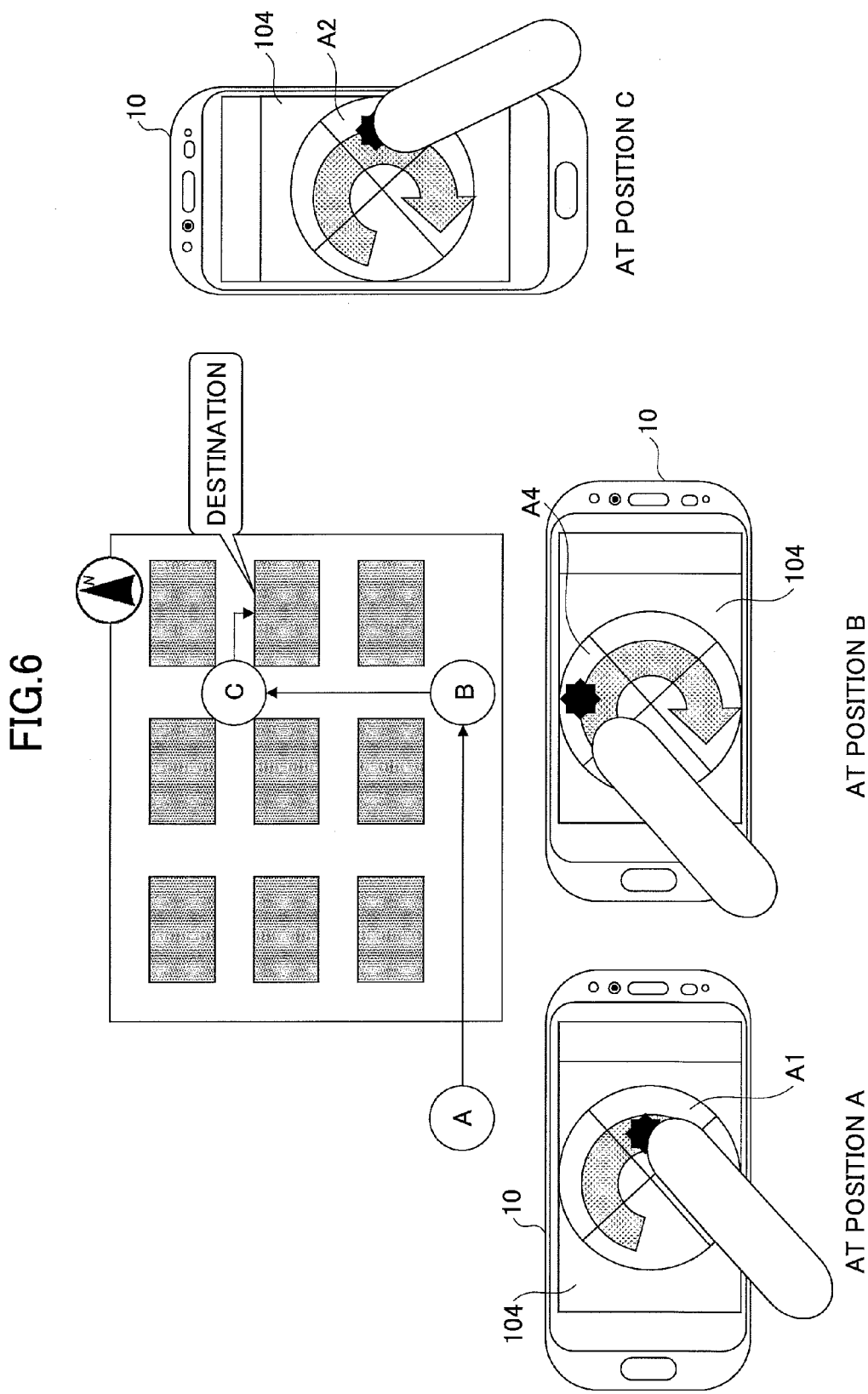

GUIDANCE APPARATUS AND GUIDANCE METHOD

CROSS-REFERENCE TO RELATED APPLICATIONS

This application is based upon and claims the benefit of priority of the prior Japanese Priority Application No. 2013-070345 filed on Mar. 28, 2013, the entire contents of which are hereby incorporated by reference.

FIELD

The disclosures herein generally relate to a guidance apparatus and a guidance method.

BACKGROUND

A method of guiding a user of a portable terminal to a destination is disclosed in Patent Document 1 as a portable navigation method that includes the following steps: A planned route from a start point to a destination is set; a GPS function calculates the current position of the portable terminal, and determines whether the current position matches a position on the planned route; if the current position matches the position on the planned route, vibration operation with a first vibration pattern is performed; if the current position does not match the position on the planned route, vibration operation with a second vibration pattern which differs from the first vibration pattern is performed; moreover, a correct direction to go for returning to the planned route is shown on a display of the portable terminal.

RELATED-ART DOCUMENTS

Patent Documents

[Patent Document 1] Japanese Laid-open Patent Publication No. 2011-220849
[Patent Document 2] Japanese Laid-open Patent Publication No. 2000-352521

However, with the technology disclosed in Patent Document 1, a user can recognize only whether the user is on a planned route because a vibration pattern is changed depending on whether the current position matches a position on the planned route. Therefore, at a position where a movement direction changes, such as an intersection or the like, the user needs to refer to the display unit of the portable terminal to confirm a direction to go.

SUMMARY

According to at least one embodiment of the present invention, a guidance apparatus for guiding to a predetermined orientation includes a detection section configured to detect a contact of an object via a contact surface; a measurement section configured to measure an orientation of the guidance apparatus; a calculation section configured to calculate a direction of the predetermined orientation relative to the orientation measured by the measurement section; and a vibration section configured to generate vibration if the contact of the object is detected by the detection section either within an area including the direction, or within another area other than the area including the direction, among a plurality of areas partitioning the contact surface.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 6 is a schematic view illustrating operation of a portable terminal.

DESCRIPTION OF EMBODIMENTS

Figure 1:
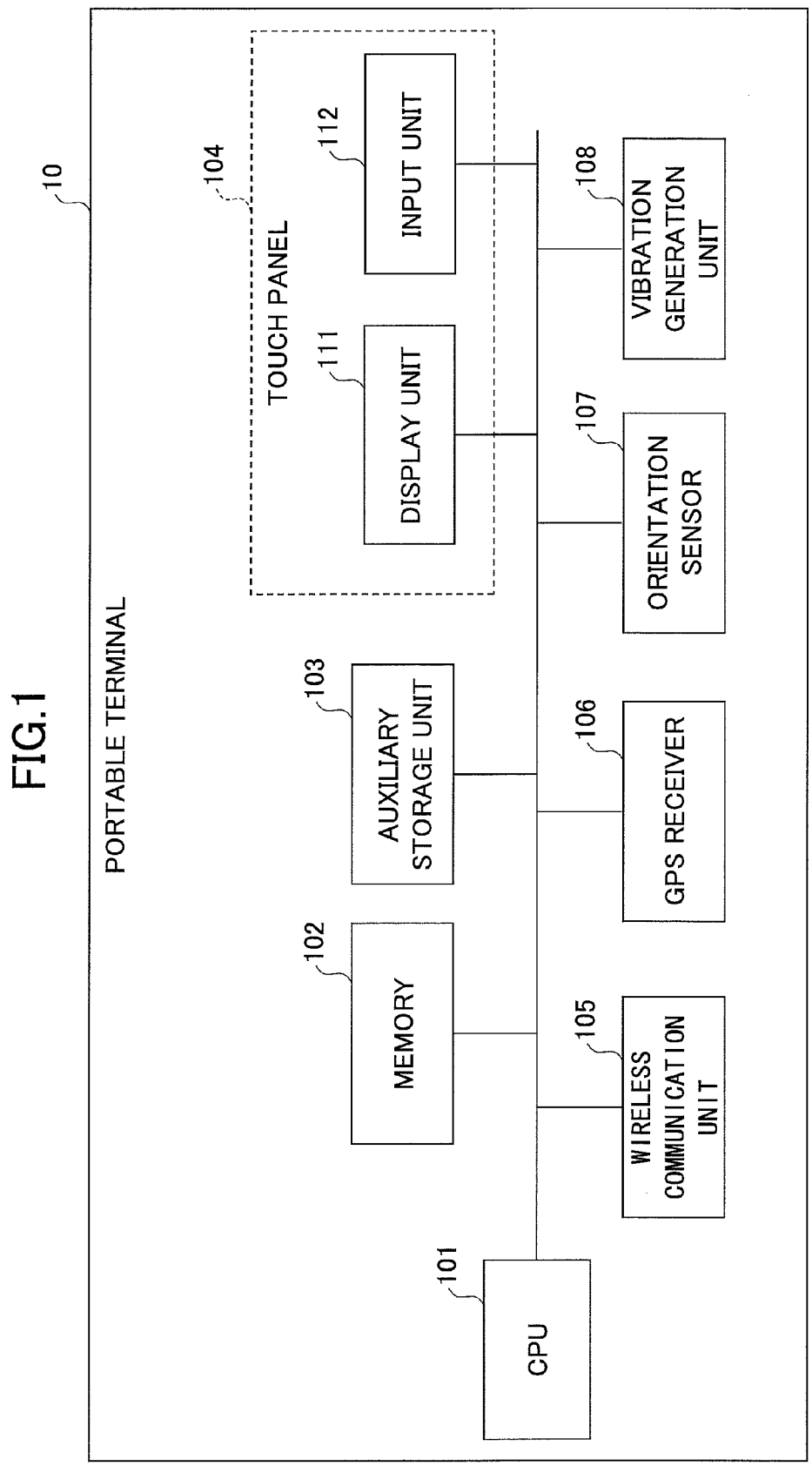
FIG. 1 is a schematic view illustrating an example of a hardware configuration of a portable terminal according to an embodiment of the present invention.

In the following, embodiments of the present invention will be described with reference to the drawings. FIG. 1 is a schematic view illustrating an example of a hardware configuration of a portable terminal 10 according to the present embodiment. In FIG. 1, the portable terminal 10 includes a CPU 101, a memory 102, an auxiliary storage unit 103, a touch panel 104, a wireless communication unit 105, a GPS receiver 106, an orientation sensor 107, and a vibration generation unit 108, and the like.

The auxiliary storage unit 103 stores a program installed on the portable terminal 10, or the like. The memory 102 reads the program from the auxiliary storage unit 103 to store the program into it when receiving a start command for the program. The CPU 101 implements functions relevant to the portable terminal 10 by executing the program stored in the memory 102.

The touch panel 104 is an electronic device provided with both an input function and a display function, which displays information, receives input from a user, and the like. The touch panel 104 includes a display unit 111, an input unit 112, and the like.

The display unit 111 is an LCD display or the like that implements the display function of the touch panel 104. The input unit 112 is an electronic device that includes a sensor for detecting a contact of a contact object on the display unit 111. The method of detecting a contact of a contact object may be one of publicly known methods including electrostatic methods, resistance film methods, optical methods, or the like. Here, a contact object is an object that makes contact with a contact surface of the touch panel 104. Examples of such an object include a finger of a user, a special-purpose pen, a generic pen, and the like.

The wireless communication unit 105 is an electronic device for communication using a wireless LAN (Local Area Network) or a mobile communication network, or the like, that includes an antenna and the like. The GPS receiver 106 receives radio waves from GPS (Global Positioning System) satellites.

The orientation sensor 107 measures the orientation of the portable terminal 10. The orientation of the portable terminal 10 means the orientation of a direction in which a certain part of the portable terminal 10 faces (the orientation of the posture of the portable terminal 10). For example, an electronic compass may be used as the orientation sensor 107 that detects an orientation using a geomagnetic sensor.

The vibration generation unit 108 is a device for vibrating the portable terminal 10. For example, the vibration generation unit 108 generates vibration to indicate an incoming call of telephone or reception of e-mail to a user when the portable terminal 10 is set in a silent mode. According to the present embodiment, the vibration generation unit 108 generates vibration to indicate a direction to go for a user.

Here, examples of the portable terminal 10 include a smart phone, a tablet-type terminal, and the like. Alternatively, the portable terminal 10 may be a special-purpose device for guiding a user with the method according to the present embodiment. Also, a touch pad may be used instead of the touch panel 104. Namely, an electronic device without a display unit but with an input unit having a contact surface may be used.

Figure 2:
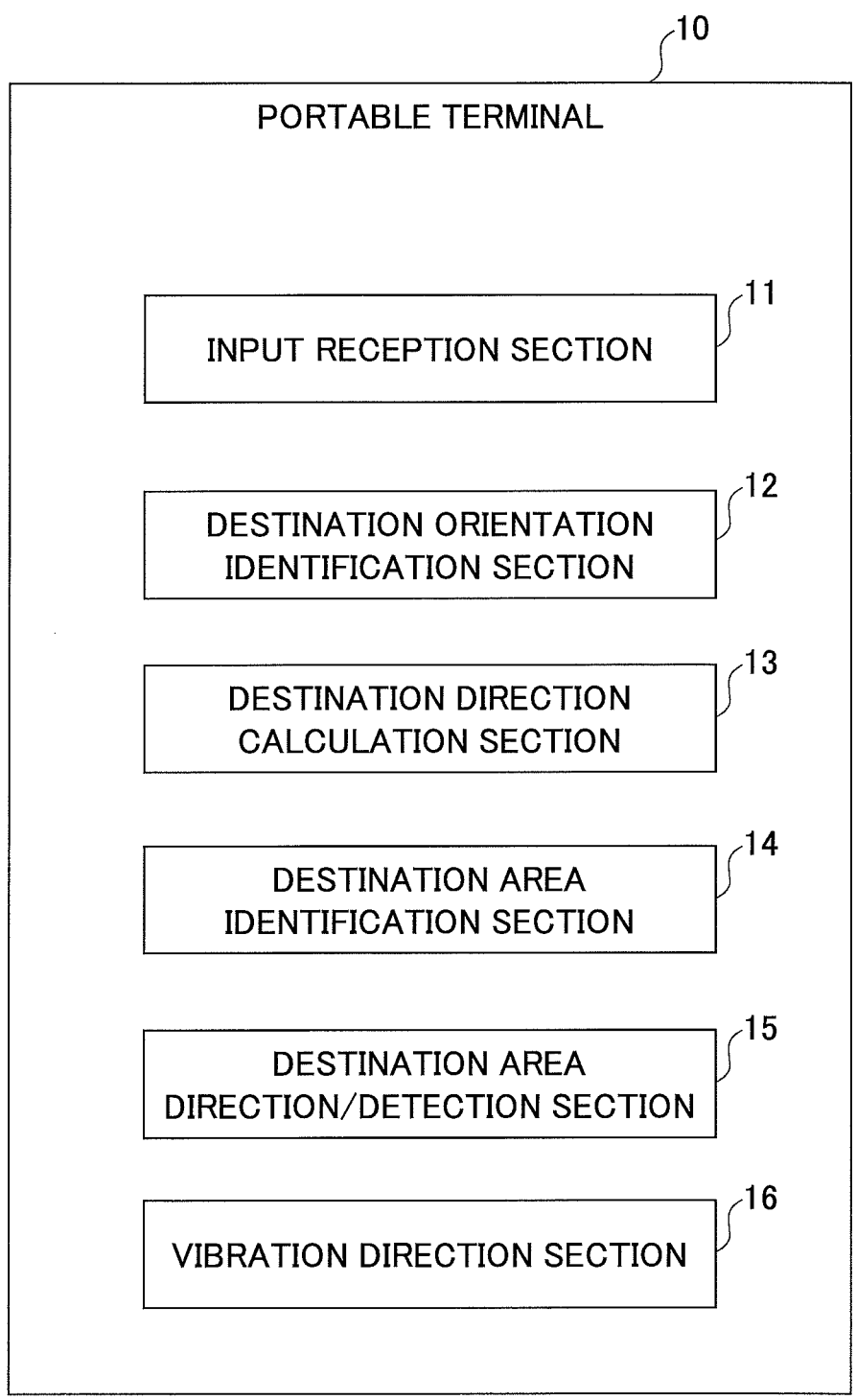
FIG. 2 is a schematic view illustrating an example of a functional configuration of a portable terminal according to an embodiment of the present invention.

FIG. 2 is a schematic view illustrating an example of a functional configuration of the portable terminal 10 according to the present embodiment. The functional configuration illustrated in FIG. 2 includes an input reception section 11, a destination orientation identification section 12, a destination direction calculation section 13, a destination area identification section 14, a destination area direction/detection section 15, a vibration direction section 16, and the like. These sections are implemented by procedures that a program installed in the portable terminal 10 has the CPU 101 execute.

The input reception section 11 receives information about a destination from a user. The destination orientation identification section 12 identifies an orientation to go from the current position to follow a path that leads to the destination. Here, according to the present embodiment, the orientation represents a value that is not affected by the direction or posture of the portable terminal 10, which is measured by the orientation sensor 107 in the portable terminal 10.

For example, the orientation is referred to as 0° for due north, 90° for due east, 180° for due south, and 270° for due west.

The destination direction calculation section 13 identifies the direction to go from the current position (called a "destination direction", hereafter). The destination direction is set to a value that takes the orientation and posture of the portable terminal 10 into account. Namely, the destination direction is the direction of an orientation that is identified by the destination orientation identification section 12 relative to the orientation of the portable terminal 10 as a reference.

The destination area identification section 14 identifies a partition area that corresponds to the destination direction (called a "destination area", hereafter) among multiple partition areas that virtually divide the contact surface of the touch panel 104. The destination area direction/detection section 15 detects a contact of an object on the destination area. The vibration direction section 16 directs the vibration generation unit 108 to generate vibration in response to a detection of a contact by the destination area direction/detection section 15.

Figure 3:
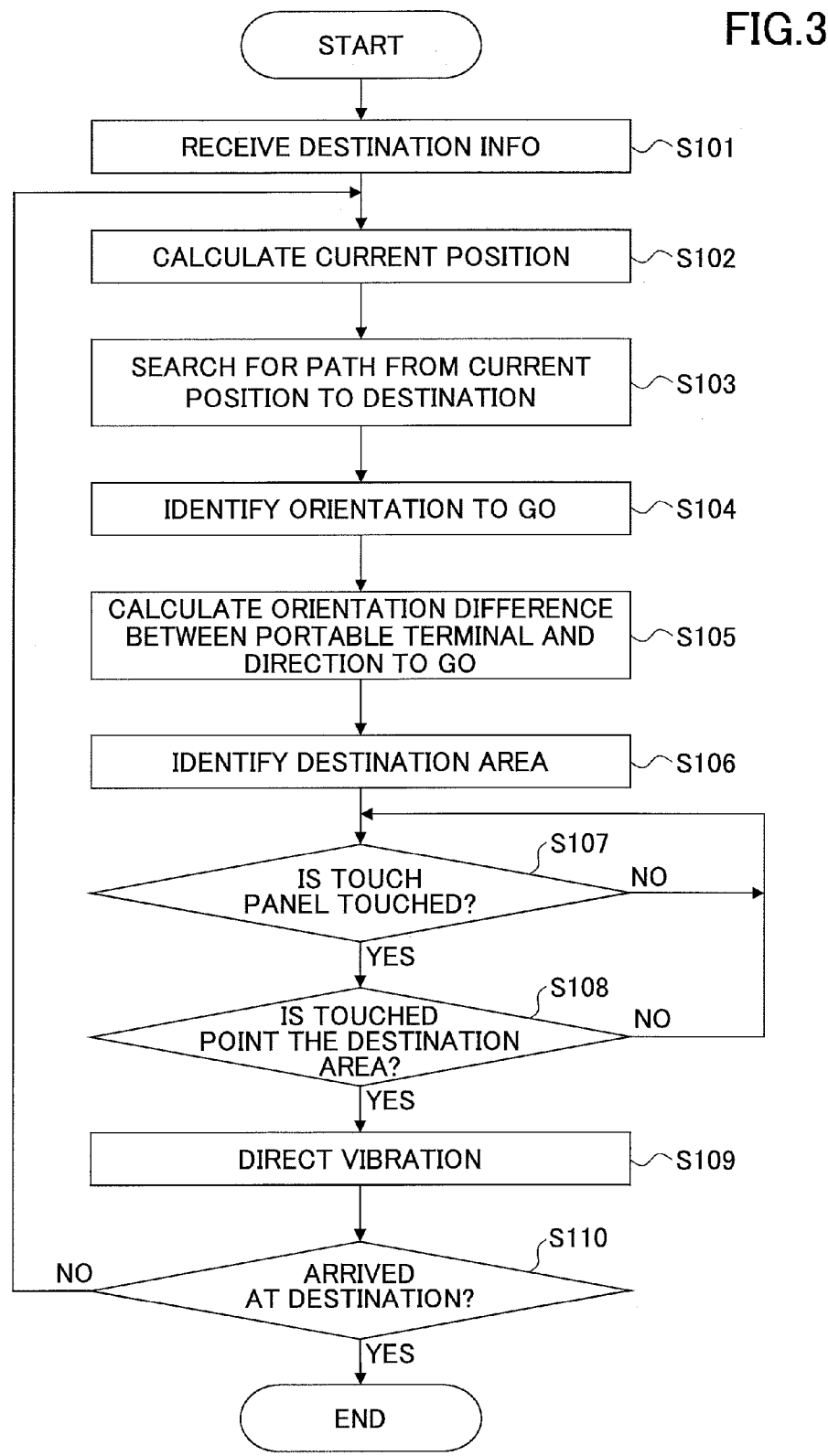
FIG. 3 is a flowchart illustrating an example of a procedure executed by the portable terminal.

In the following, a procedure will be described that is executed by the portable terminal 10. FIG. 3 is a flowchart illustrating an example of the procedure executed by the portable terminal 10.

At Step S101, the input reception section 11 receives destination information via, for example, the touch panel 104. The destination information is identification information that includes the name, telephone number, address or the like of the destination. Alternatively, the destination information may be input by selecting a certain position on a map displayed on the display unit 111. In this case, the destination information may be represented by the latitude and longitude of the position.

Next, the destination orientation identification section 12 calculates the current position based on radio waves received by the GPS receiver 106 (Step S102). Consequently, for example, the latitude and longitude of the current position of the portable terminal 10 (and the user having the portable terminal 10) are identified.

Next, the destination orientation identification section 12 searches for a path (route) from the current position to the destination based on the current position information and the destination information (Step S103). Path search may be performed with a publicly known technology. For example, the destination orientation identification section 12 may make a connection with a mobile communication network using the wireless communication unit 105, then make a request for a path search service provided on the mobile communication network.

Next, the destination orientation identification section 12 identifies the orientation of a direction to go from the current position (called a "direction to go", hereafter) on the searched for path (Step S104). If it is required to go in the direction in the east from the current position, the direction representing the east is identified as the orientation of the direction to go. Here, the orientation of the direction to go may be directly input by a user. For example, if the user wants to know which direction is the north, the north may be input as the direction to go. In this case, it is not necessary to input the destination information or to perform path search.

Next, the destination direction calculation section 13 calculates a difference between the orientation of the portable terminal 10 and the orientation of the direction to go (orientation difference) (Step S105). The orientation of the portable terminal 10 is an orientation that a predetermined part of the portable terminal 10 faces, which is measured by the orientation sensor 107 of the portable terminal 10. Therefore, the difference represents the destination direction at the current position.

Next, the destination area identification section 14 identifies a partition area that corresponds to the destination direction as the destination area, among partition areas that divide the contact surface (surface) of the touch panel 104 (Step S106).

Figures 4, 5:
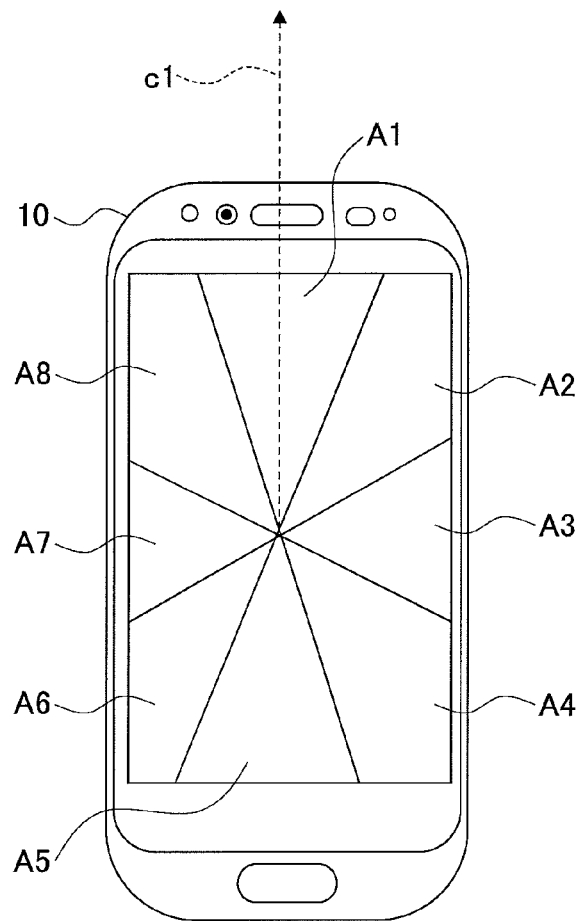
FIG. 4 is a schematic view illustrating an example of partitioning of a contact surface.
FIG. 5 is a schematic view illustrating an example of a configuration of a partition table.

FIG. 4 is a schematic view illustrating an example of partitioning of the contact surface. FIG. 4 illustrates an example in which the contact surface is divided into eight partition areas. Partition areas may be formed with, for example, straight lines that pass through the cross point of the diagonal lines of the contact surface. Here, the forms of the partition areas may not be necessarily displayed on the display unit 111. Also, the dashed line c1 in FIG. 4 is drawn for the sake of explanation of the ranges of the partition areas.

The ranges of the partition areas may be identified based on a partition table illustrated in FIG. 5.

FIG. 5 is a schematic view illustrating an example of a configuration of a partition table. As illustrated in FIG. 5, the partition table stores the name and range for each of the partition areas. An area name is an identification name of the partition area. A range is specified by two angles of the two straight lines that form the partition area, where the angles are measured relative to the dashed line c1. The angle is an angle relative to the dashed line c1 where the positive direction is taken as clockwise.

Here, the content of the partition table may be dynamically rewritten by the destination area identification section 14 depending on the current position. For example, if the current position is at a crossroad, the partition table may be rewritten so that four partition areas are formed, or if the current position is at the five-forked road, five partition areas are formed. In these cases, the ranges of the partition areas may be adjusted depending on branch directions. Here, the partition table is stored, for example, in the auxiliary storage unit 103.

At Step S106, one of the eight partition areas is identified as the destination area, and the area name of the destination area is stored into the memory 102, for example.

Next, the destination area direction/detection section 15 waits for a detection of a contact of a contact object on the contact surface of the touch panel 104 (Step S107). For example, if a contact on the contact surface made by a finger of the user is detected by the input unit 112 (Step S107 YES), the destination area direction/detection section 15 determines whether the contact position on the contact surface is within the range of the destination area (Step S108). Here, the contact position is obtained from the input unit 112. Also, the range of the destination area can be identified with the destination area name and the partition table stored in the memory 102.

If the contact position is not within the range of the destination area (Step S108 NO), Steps S107 and after are repeated. For example, a state continues in which a finger of a user slides over the contact surface.

If the contact position is within the range of the destination area (Step S108 YES), the vibration direction section 16 directs the vibration generation unit 108 to generate vibration (Step S109). In response to the direction, the vibration generation unit 108 generates vibration. Consequently, the vibration is transferred to the hand of the user holding the portable terminal 10, so that the user can recognize which area is the direction to go based on the relative position and direction of the contact position on the contact surface.

Here, the vibration may be continued while the finger of the user or the like is kept on contacting the destination area. If the contact is released, for example, if the finger of the user or the like is detached from the destination area, the vibration may be stopped. Also, sound may be output along with the vibration.

Steps S102 and after are continued until the portable terminal 10 reaches the destination. When the portable terminal 10 reaches the destination (Step S110 YES), the procedure in FIG. 3 ends. Here, the procedure in FIG. 3 may be forcibly terminated by the user inputting a command.

Operation of the portable terminal 10 based on the procedure in FIG. 3 will be described with a concrete example. FIG. 6 is a schematic view illustrating operation of the portable terminal 10.

Suppose that a user is at a position A when the procedure in FIG. 3 starts. When the procedure in FIG. 3 starts, a path from the position A to the destination is searched for. An example in FIG. 6 illustrates a searched for path that goes through positions A, B, C, and the destination.

In FIG. 6, a portable terminal 10 designated with "AT POSITION A" illustrates the direction and operation of the portable terminal 10 at the position A. In the example in FIG. 6, there are four partition areas on the contact surface of the touch panel 104 for convenience's sake. The portable terminal 10 has the orientation in the east (the orientation of the line c1 in FIG. 4) as illustrated in FIG. 6 designated with "AT POSITION A". Also, the destination orientation is also set in the east. Here, a value of the orientation is represented by an angle where due north is referred to as 0°. At the position A, the destination direction is 0° because the orientation of the portable terminal 10 coincides with the destination orientation. Therefore, the area A1 corresponds to the destination area. Namely, if the user touches the area A1 with a finger, the portable terminal 10 vibrates. Consequently, the user can recognize that the direction to the position B is the direction to go.

In FIG. 6, a portable terminal 10 designated with "AT POSITION B" illustrates the direction and operation of the portable terminal 10 at the position B. As illustrated, the orientation of the portable terminal 10 remains designating in the east soon after arriving at the position B. On the other hand, the destination orientation is the north. Therefore, the destination direction is 270°, and the area A4 corresponds to the destination area. Namely, if the user touches the area A4 with a finger, the portable terminal 10 vibrates. Consequently, the user can recognize that the direction to the position C is the direction to go, which is on the left hand side from the users' point of view.

In FIG. 6, a portable terminal 10 designated with "AT POSITION C" illustrates the direction and operation of the portable terminal 10 at the position C. As illustrated, the portable terminal 10 has the orientation in the north soon after arriving at the position C. On the other hand, the destination orientation is the east. Therefore, the destination direction is 90°, and the area A2 corresponds to the destination area. Namely, if the user touches the area A2 with a finger, the portable terminal 10 vibrates. Consequently, the user can recognize that the direction to the destination is the direction to go, which is on the right hand side from the users' point of view.

Here, as illustrated in FIG. 6 with "AT POSITION A", "AT POSITION B", and "AT POSITION C", if the user slides the finger on the contact surface as if drawing a circle, it is easier for the user to recognize a relative position and direction of the contact position and the contact surface.

As described above, according to the present embodiment, a user can recognize a destination direction by sliding a finger or the like on the touch panel 104. Therefore, the frequency to confirm the display unit 111 can be reduced. Namely, a degree of dependence on visual information can be reduced when confirming the direction to go. Consequently, it is possible for a user to reduce a risk of having distracted attention to the surroundings, which may be induced if the user pays close attention to the display unit 111. Also, it is possible for a visually impaired user to have convenience of using a guidance function to a destination direction.

Also, the present embodiment can be implemented with a general purpose device such as a smart phone, a tablet-type terminal, or the like.

Here, although an example in the present embodiment is described where vibration is generated if an object comes into contact with the destination area among multiple partitioned areas, vibration may be generated if an object comes into contact with partition areas other than the destination area. In this case, if the object comes into contact with the destination area, vibration is stopped. In this way, it is also possible to indicate the direction to go to the user.

Here, according to the present embodiment, the portable terminal 10 is an example of a guidance apparatus. The input unit 112 or the touch panel 104 is an example of a detection section. The orientation sensor 107 is an example of a measurement section. The destination direction calculation section 13 is an example of a calculation section. The vibration direction section 16 and the vibration generation unit 108 are an example of a vibration section.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present invention have been described in detail, it should be understood that the various changes, substitutions, and alterations could be made hereto without departing from the spirit and scope of the invention.

What is claimed is:

1. A guidance apparatus for guiding to a predetermined orientation, comprising:
    a detection section configured to detect a contact of an object via a contact surface;
    a measurement section configured to measure an orientation of the guidance apparatus;
    a calculation section configured to calculate a direction of the predetermined orientation relative to the orientation measured by the measurement section; and
    a vibration section configured to generate vibration if the contact of the object is detected by the detection section either within an area including the direction, or within another area other than the area including the direction, among a plurality of areas partitioning the contact surface.

2. A guidance method for guiding to a predetermined orientation executed by a guidance apparatus, the method comprising:
    detecting a contact of an object to a contact surface;
    measuring an orientation of the guidance apparatus;
    calculating a direction of the predetermined orientation relative to the orientation measured by the measuring; and
    generating vibration if the contact of the object is detected by the detection section either within an area including the direction, or within another area other than the area including the direction, among a plurality of areas partitioning the contact surface.

3. A non-transitory computer-readable recording medium having a program stored therein for causing a guidance apparatus to execute a guidance method for guiding to a predetermined orientation, the method comprising:
    detecting a contact of an object to a contact surface;
    measuring an orientation of the guidance apparatus;
    calculating a direction of the predetermined orientation relative to the orientation measured by the measuring; and
    generating vibration if the contact of the object is detected by the detection section either within an area including the direction, or within another area other than the area including the direction, among a plurality of areas partitioning the contact surface.

* * * * *